US009796636B2

(12) United States Patent
Gorzkowski, III et al.

(10) Patent No.: US 9,796,636 B2
(45) Date of Patent: Oct. 24, 2017

(54) CERAMIC LAMELLAR COMPOSITES (71) Applicant: The United States of America, as represented by the Secretary of the Navy, Washington, DC (US)

(72) Inventors: Edward P. Gorzkowski, III, Odenton, MD (US); Ming-Jen Pan, Springfield, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/150,612

(22) Filed: May 10, 2016

(65) Prior Publication Data
US 2016/0251271 A1    Sep. 1, 2016

Related U.S. Application Data (62) Division of application No. 12/614,696, filed on Nov. 9, 2009, now abandoned.
(Continued)

(51) Int. Cl.
*H01G 4/00*     (2006.01)
*C04B 35/00*    (2006.01)
(Continued)

(52) U.S. Cl.
CPC .......... *C04B 38/0605* (2013.01); *B28B 1/007* (2013.01); *B28B 1/008* (2013.01); *C04B 35/4682* (2013.01); *C04B 35/6261* (2013.01); *C04B 35/62655* (2013.01); *C04B 38/00* (2013.01); *C04B 41/009* (2013.01); *C04B 41/4853* (2013.01); *C04B 41/4884* (2013.01); *C04B 41/4961* (2013.01); *C04B 41/83* (2013.01); *C04B 41/84* (2013.01); *H01B 3/302* (2013.01); *H01B 3/40* (2013.01); *H01B 3/46* (2013.01); *H01G 4/1227* (2013.01);
(Continued)

(58) Field of Classification Search
CPC ....... H01B 3/12; C04B 35/46; C04B 35/4682; C04B 38/0605
USPC ...................... 501/134, 136, 137; 361/301.1
See application file for complete search history.

(56) References Cited

U.S. PATENT DOCUMENTS 7,304,830 B2 * 12/2007 Iwanaga .................. H01G 4/12
361/306.1

OTHER PUBLICATIONS

E.P. Gorzkowski and M.J. Pan, Nov. 4, 2007, Naval Research Laboratory, pp. 1-4.*

* cited by examiner

*Primary Examiner* — Eric Thomas
*Assistant Examiner* — Arun Ramaswamy
(74) *Attorney, Agent, or Firm* — US Naval Research Laboratory; Dawn C. Russell (57) ABSTRACT Disclosed herein is a method of: placing between a cooling element and an opposing surface a slurry of: a dielectric powder containing barium titanate, a dispersant, a binder, and water; maintaining the cooling element at a temperature below the opposing surface to cause the formation of ice platelets perpendicular to the surface of the cooling element and having the powder between the platelets; subliming the ice platelets to create voids; sintering the powder to form the dielectric material; and filling the voids with the polymeric material. The process can produce a composite having: a sintered dielectric material of barium titanate and platelets of a polymeric material embedded in the dielectric material. Each of the platelets is perpendicular to a surface of the composite.

10 Claims, 12 Drawing Sheets

Related U.S. Application Data (60) Provisional application No. 61/112,206, filed on Nov. 7, 2008.

(51) Int. Cl.
    *C04B 38/06* (2006.01)
    *B28B 1/00* (2006.01)
    *C04B 35/468* (2006.01)
    *C04B 35/626* (2006.01)
    *C04B 38/00* (2006.01)
    *C04B 41/00* (2006.01)
    *C04B 41/48* (2006.01)
    *C04B 41/49* (2006.01)
    *C04B 41/83* (2006.01)
    *C04B 41/84* (2006.01)
    *H01G 4/12* (2006.01)
    *H01G 4/20* (2006.01)
    *H01B 3/30* (2006.01)
    *H01B 3/40* (2006.01)
    *H01B 3/46* (2006.01)
    *C04B 111/00* (2006.01)

(52) U.S. Cl.
    CPC .... *H01G 4/206* (2013.01); *C04B 2111/00844* (2013.01); *C04B 2235/6562* (2013.01); *C04B 2235/6565* (2013.01); *C04B 2235/787* (2013.01)

CERAMIC LAMELLAR COMPOSITES

This application is a divisional application of pending U.S. application Ser. No. 12/614,696, filed on Nov. 9, 2009, which claims the benefit of U.S. Provisional Application No. 61/112,206, filed on Nov. 7, 2008. This provisional application and all other publications and patent documents referred to throughout this nonprovisional application are incorporated herein by reference.

TECHNICAL FIELD

The present disclosure is generally related to dielectric composites.

DESCRIPTION OF RELATED ART

It has been demonstrated that a nacre-like laminar alumina body could be fabricated using a novel ice template process (Deville et al., "Freezing as a Path to Build Complex Composites" *Science*, 311, 515-518 (2006); Deville et al., "Ice-templated porous alumina structures" *Acta Materialia*, 55, 1965-1974 (2007)). This technique entails freezing an aqueous ceramic slurry unidirectionally along the longitudinal axis of a cylindrical mold to form ice platelets and ceramic aggregates. Given the proper conditions, which include slurry viscosity, percentage water, temperature gradient, and starting temperature, the ice platelets are aligned along the temperature gradient direction. The proper starting temperature and temperature gradient are be maintained so that homogeneous freezing occurs and hexagonal ice is formed. This allows the ice front to expel the ceramic particles in such a way to form long range order for both the ceramic and the ice. Upon freeze drying, the ice platelets sublime and leave a laminar ceramic structure with long empty channels in the direction of the temperature gradient. Subsequently the green ceramic body is sintered to form the final microstructure. This process is used to increase the mechanical properties of the ceramic body.

BRIEF SUMMARY

Disclosed herein is a composite comprising: a sintered dielectric material comprising barium titanate and platelets of a polymeric material embedded in the dielectric material. Each of the platelets is perpendicular to a surface of the composite.

Also disclosed herein is a method comprising: placing between a cooling element and an opposing surface, a slurry comprising: a powder of a dielectric material comprising barium titanate, a dispersant, a binder, and water; maintaining the cooling element at a temperature below the opposing surface to cause the formation of ice platelets perpendicular to the surface of the cooling element and having the powder between the platelets; subliming the ice platelets to create voids; sintering the powder to form the dielectric material; and filling the voids with the polymeric material.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Previously, the freeze casting process was used to increase the mechanical properties of the ceramic body, but a ceramic-polymer composite with excellent dielectric properties may be made by adapting the technique. The adaptation involves 1) using a high K material as the ceramic phase, 2) infiltrating the space between ceramic lamellae with a polymer material, and 3) applying electrodes perpendicular to the ceramic-polymer alignment direction to form an electrically parallel composite dielectric.

Disclosed herein is the use of a freeze casting technique to construct ceramic-polymer composites in which the two phases are arranged in an electrically parallel configuration. By doing so, the composites can exhibit dielectric constants (K) up to two orders of magnitude higher than that of composites with ceramic particles randomly dispersed in a polymer matrix. In this technique, an aqueous ceramic slurry is frozen unidirectionally to form ice platelets and ceramic aggregates that are aligned in the temperature gradient direction. This occurs because the fastest growth of the ice occurs in the prism facet normal (basal plane) direction, resulting in good alignment of the platelets parallel to the cooling direction. The ice has a hexagonal crystal structure. In general, the higher the cooling rate the thinner the platelets. For example, a 1° C./min cooled sample may have 18 μm thick platelets, while a 10° C./min cooled sample may have 5 μm thick platelets. The temperature difference may be maintained by using a second cooling element as the opposing surface. The temperature difference may be, for example, 5, 10, 15, 20, 60, or 70° C. or any value in between. The opposing surface may be parallel to the cooling element.

Upon freeze drying, the ice platelets sublime and leave the lamellar ceramic structure intact. The green ceramic body is fired to retain the microstructure and then the spaces between ceramic lamellae are infiltrated with a polymer material. The finished composites can exhibit the high dielectric constant (1000) of ferroelectric ceramics while maintaining the unique properties of polymer materials such as graceful failure, low dielectric loss, and high dielectric breakdown.

A capacitor may be made by placing two electrodes in electrical contact with the material. The electrodes may be on opposing sides of the material and be perpendicular to the platelets. The electrodes may be placed by, for example, sputtering, painting, or screen printing. The method of placement may affect the apparent dielectric constant.

Table 1 shows various tradeoffs in properties for different filter capacitors. Performance of the capacitor typically lags far behind that of semiconductor switches. The capacitor often is the limiting factor in power converter design. In state-of-the-art power converters, filter capacitors occupy 50 to 70% of the overall volume. Aluminum electrolytic capacitors are often used due to their high capacitance and low cost. The presently disclosed material can optimize these properties at medium cost.

TABLE 1

| Material | Dielectric Constant | Dielectric Loss | Dielectric Breakdown | Cost ($/Farad) |
|---|---|---|---|---|
| Ceramic | 4000 | Medium | Low; catastrophic | High |
| Polymer | 3 | Low | High; self-clearing | Low/Medium |
| Al Electrolytic | 9 | high | High; self-clearing | Low |
| Freeze-Cast Composite | 1000 | L-to-M | Medium; self-clearing | Medium |

Figure 1:
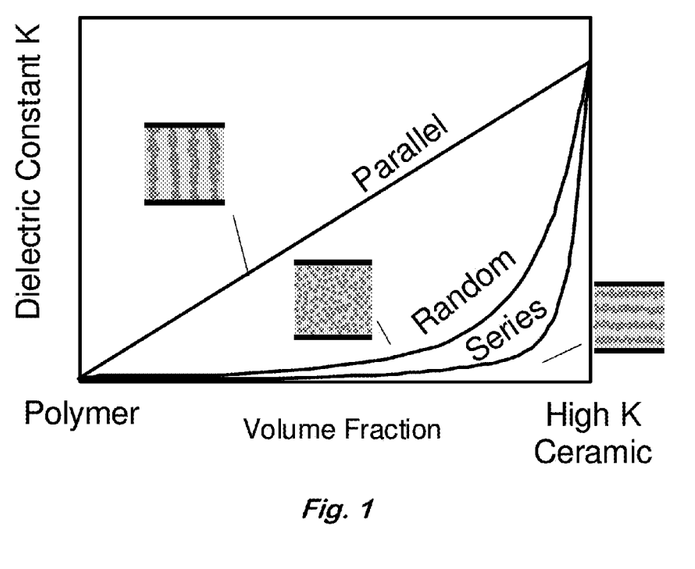
FIG. 1 shows the general shape of dielectric constant vs. % ceramic curves for different geometries.

The dielectric constant may vary depending on the direction in which it is measured, as the material is anisotropic. FIG. 1 shows how the dielectric constant may vary as a function of percent ceramic for different orientations. When measuring parallel to the platelets, the ideal curve is linear. When measuring perpendicular to the platelets such that they are in series, the values of K remain low until very high ceramic loading. The K values may be lower even than for random dispersions of ceramic in polymer. Illustrative of possible values, 50% loading in the parallel configuration may produce a K of 2000, while the random and series values may be 30-60 and 6 respectively. The parallel configuration can take advantage of the complementary nature of both constituents: the functionality of the ceramic phase (dielectric, piezoelectric etc.) and the flexibility, scale-up capability, and low cost of the polymer material.

The polymer component can be epoxy, silicone, polyurethane, polypropylene, or any polymer having a low enough viscosity to infiltrate the voids in the sintered ceramic. The infiltration may also be performed at an elevated temperature and/or in a vacuum. The overall dielectric response may be similar regardless of the polymer matrix due to polymers having similar dielectric constants. Silicone samples may be very flexible while still maintaining good dielectric properties.

The epoxy used in the examples below was not flexible enough to bend by hand, but any thermoplastic or mixable thermoset polymer can be infiltrated. Therefore, the composite can maintain the flexibility and ease of post-processing handling of polymer materials. In fact, flexible polymer/ceramic capacitors with high dielectric constant and high breakdown strength can be produced.

Figure 2:
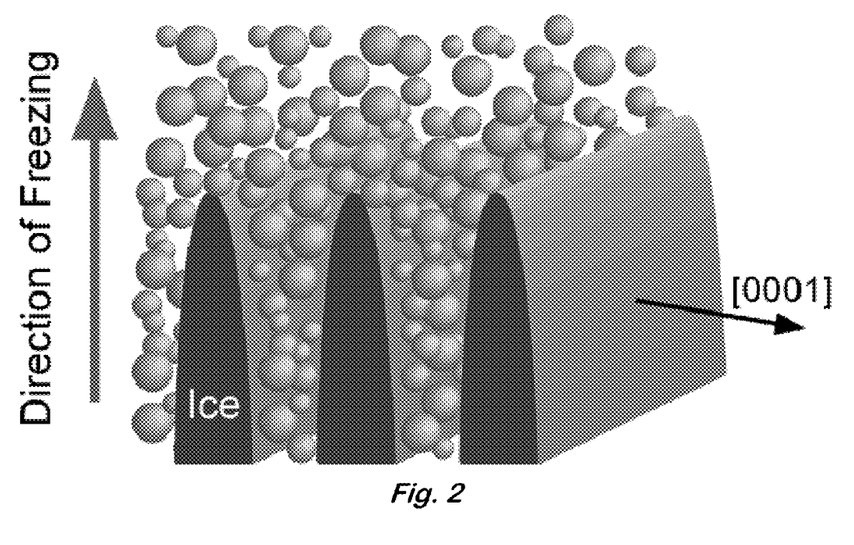
FIG. 2 schematically illustrates the freeze-casting process.

FIG. 2 schematically illustrates the freeze-casting process. The ice platelets grow upwards from the cooling element (not shown) below, while the ceramic particles (spheres) are pushed into regions between the platelets. The platelets are generally perpendicular to the cooling element. As used herein "cooling element" includes the surface upon which the ice grows regardless of any separation between that surface and the source of the cooling. As used herein, "parallel" and "perpendicular" are approximations that do not necessarily indicate absolute 0° and 90° angles. The angles may vary from the ideal by, for example, 5, 10, or 20°. FIG. 2 shows the platelets as parallel to each other. This condition may occur locally and the material may also show such long range order. The platelets may also have random orientations, so long as they are perpendicular to the cooling element. The orientation of the platelets may also be influenced by templating the cooling element. Templating may be performed by directionally abrading the cooling element. A templated cooling element may also be used with other dielectrics.

In one study, the ceramic component was chosen to show the versatility of the process. Barium titanate X7R is generally used in multilayer ceramic capacitors (MLCCs). X7R is an EIA specification that requires that the dielectric constant range ±15% from the samples room temperature dielectric constant over the temperature range of −55 to 125° C. (Liu et al., "The core-shell structure in ultrafine X7R dielectric ceramics" *J. Kor. Phys. Soc.*, 32, s312-s315 (1998)). This material is highly doped to avoid the normal huge peak in dielectric constant at the Curie temperature.

The microstructure of the sintered samples consists of ceramic plates aligned in the direction of the temperature gradient. In previous studies (Gorzkowski et al., "Novel Ceramic-Polymer Composites via the Freeze Casting Method," *Proceedings of the* 13*th US-Japan Seminar on Dielectric and Piezoelectric Ceramics*, 212-215, Nov. 4-7, 2007; Gorzkowski et al., "Ceramic-Polymer Dielectric Composites Produced via Directional Freezing" *Adv. Electroceramic Mat.: Ceramic Trans.*, 204, 3-9 (2009)) interconnects formed between the ceramic plates, but better care was taken to make sure that the cooling rate was controlled. By controlling the cooling rate the ice front does not reach the supersaturation of the ceramic and thus no particle repulsion which causes the local ice crystal front to split leaving behind an agglomerate of ceramic particles. In addition the platelets are not exactly parallel to the temperature gradient. This is due to the differences between the imposed and the preferred growth directions. The preferred growth direction is controlled by the system i.e. interfacial energies while the imposed growth direction is highly dependent on the temperature gradient. If the temperature gradient is too low then the preferred growth direction dominates and thus the platelets grow a few degrees off of the temperature gradient direction. A larger temperature gradient can correct this problem.

The following examples are given to illustrate specific applications. These specific examples are not intended to limit the scope of the disclosure in this application.

Example 1

Barium Titanate Composite—

Ceramic slurries were prepared by mixing purified water with 2 wt % of the ammonium polymethacrylate dispersant, Darvan C, (R.T. Vanderbilt Co., Norwalk, Conn.), 1 wt % of polyvinyl alcohol (Alfa Aesar, Ward Hill, Mass.), and x % barium titanate X7R (Ferro Corporation Cleveland, Ohio) where x is 50, 60, and 70 wt %. Slurries were ball-milled in a high density polyethylene bottle for 12 h with zirconia milling media and de-aired in a vacuum desiccator. Freezing of the slurries was accomplished by pouring them into a Teflon mold (1.5 in. diameter, 0.75 in. tall) and cooled using a custom built freezing setup. The mold was placed between 2 copper rods that are cooled from room temperature by liquid nitrogen to −60° C. at 5° C./min. Band heaters were attached to the copper rods to control the cooling rate and temperature gradient between the copper rods (10° C.). The samples were freeze-dried (Freeze Dryer 2.5, Labconco, Kansas City, Mo.) for 24 h.

Samples were then removed from the mold for binder burnout and bisque firing. This was done by heating the samples at 1.2° C./min to 300° C., 0.1° C./min to 350° C., 0.6° C./min to 500° C., 5° C./min to 900° C., and finally, a 1 h dwell at 900° C. The samples were then sintered at 1300° C. for 2 h. Each cylindrical sample was then infiltrated with Epotek 301 Epoxy (Epoxy Technology, Billerica, Mass.) under vacuum creating a composite that was 25 vol % ceramic, 75 vol % polymer. Smaller cylindrical plate capacitor samples were cut and prepared for dielectric testing. This entailed lapping the samples using 400 and 600 grit SiC slurry to create flat parallel faces. Some samples were gold coated for capacitance measurement, while others were masked for breakdown and $d_{33}$ measurements. The dielectric constant and loss were measured using an HP 4284a (Hewlett Packard, Palo Alto, Calif.) at 0.1, 1, 10, and 100 kHz from 150 down to −60° C. The breakdown measurements were made using a Hipot tester (QuadTech) at 100 V/s.

Pieces from each of the various samples were mounted onto a stub and imaged using Light Optical Microscopy (LOM). Images of these surfaces were obtained using an Olympus stereo microscope (Olympus Corporation, Tokyo, Japan).

The room temperature dielectric constant was found to be ~500 for the barium titanate X7R/Epoxy composite that was produced. This is two orders of magnitude higher than the epoxy (~4) and traditional barium titanate composite dielectrics. The aligned structure that is formed in these composites leads to the parallel configuration that is discussed in composite theory. This means that each plate's capacitance is additive because capacitors in parallel are additive and thus the dielectric constant is increased.

Figure 3:
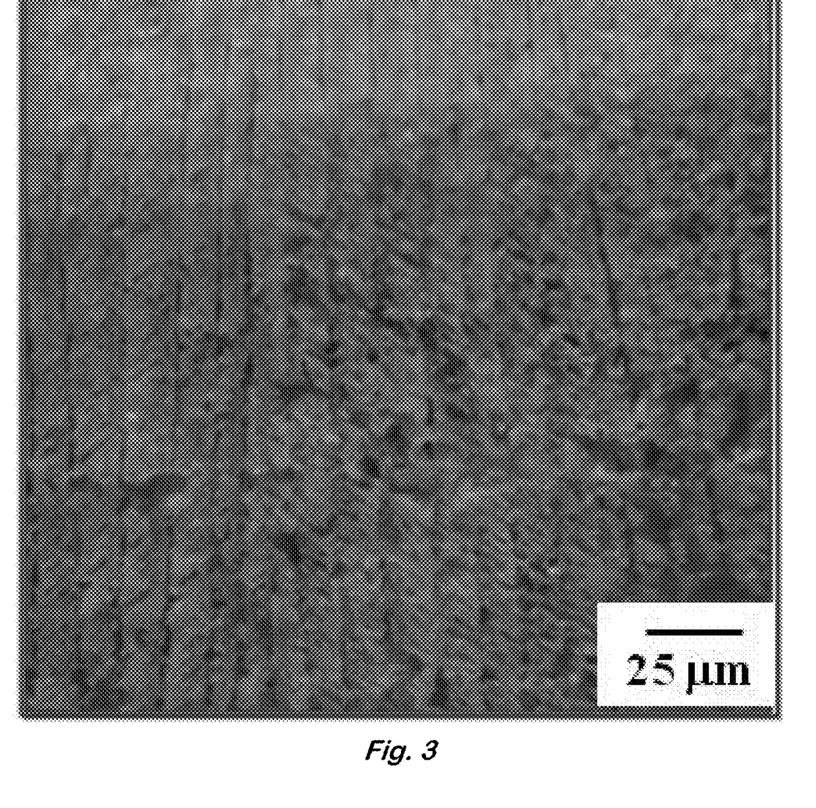
FIG. 3 shows a light optical microscope (LOM) image of a barium titanate sample sintered at 1300° C. for 2 hrs showing the aligned plates that have formed in the temperature gradient direction.

FIG. 3 shows an image of the microstructure of an as-sintered barium titanate X7R sample. The parallel plates that are formed during the directional freezing can clearly be seen. The cooling rate for this sample was 5° C./min which accounts for small size of the ceramic plates. The size of the plates is related to the cooling rate in that the fast the cooling rate the thinner the plates.

Figure 4:
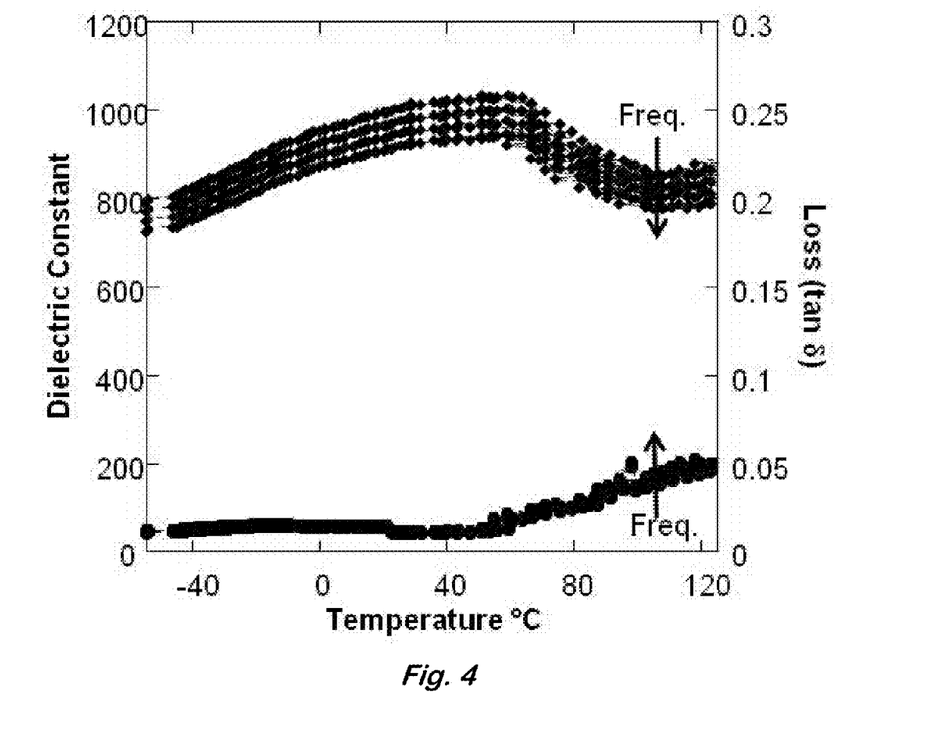
FIG. 4 shows the dielectric constant and loss versus temperature for the freeze-cast barium titanate X7R sample sintered at 1300° C. for 2 hrs.

FIG. 4 shows the dielectric constant and loss versus temperature plot for the sample shown in FIG. 3. The dielectric constant exhibits the X7R behavior with a peak of 1000, which is two orders of magnitude higher than that of conventionally made composites. The dielectric loss of the sample is also low which is a result of the polymer component of the composite.

Figure 5:
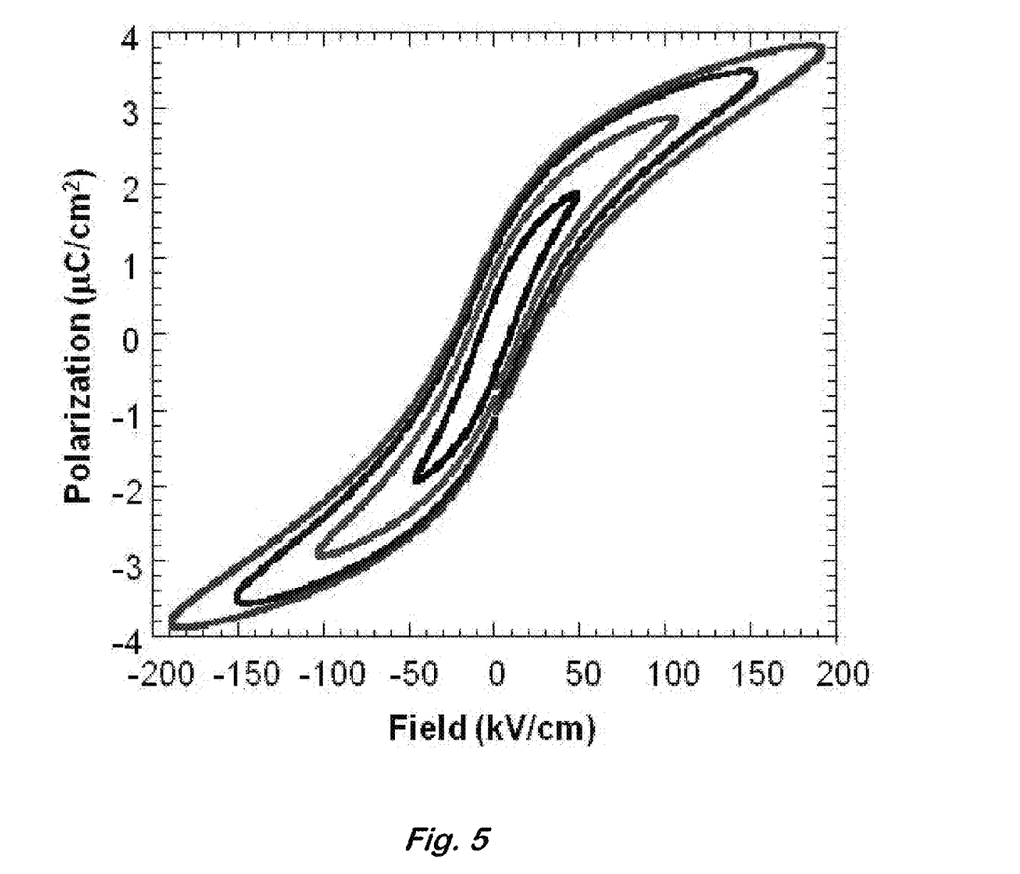
FIG. 5 shows the polarization versus field plot for the freeze-cast barium titanate X7R sample sintered at 1300° C. for 2 hrs.

FIG. 5 shows the hysteresis behavior for the sample shown in FIG. 3. The loop is ferroelectric in nature and is what would be expected from a barium titanate ceramic sample. It seems that the composite exhibits ceramic like hysteresis behavior. In fact the $d_{33}$ was measured to be 50 pC/N which is comparable to commercially available X7R ceramic. On the other hand the breakdown strength is two times higher than ceramic barium titanate, which means that the polymer component seems to control the breakdown strength. The composite may exhibit desirable properties from each component which further shows the usefulness of this technique.

Figure 6:
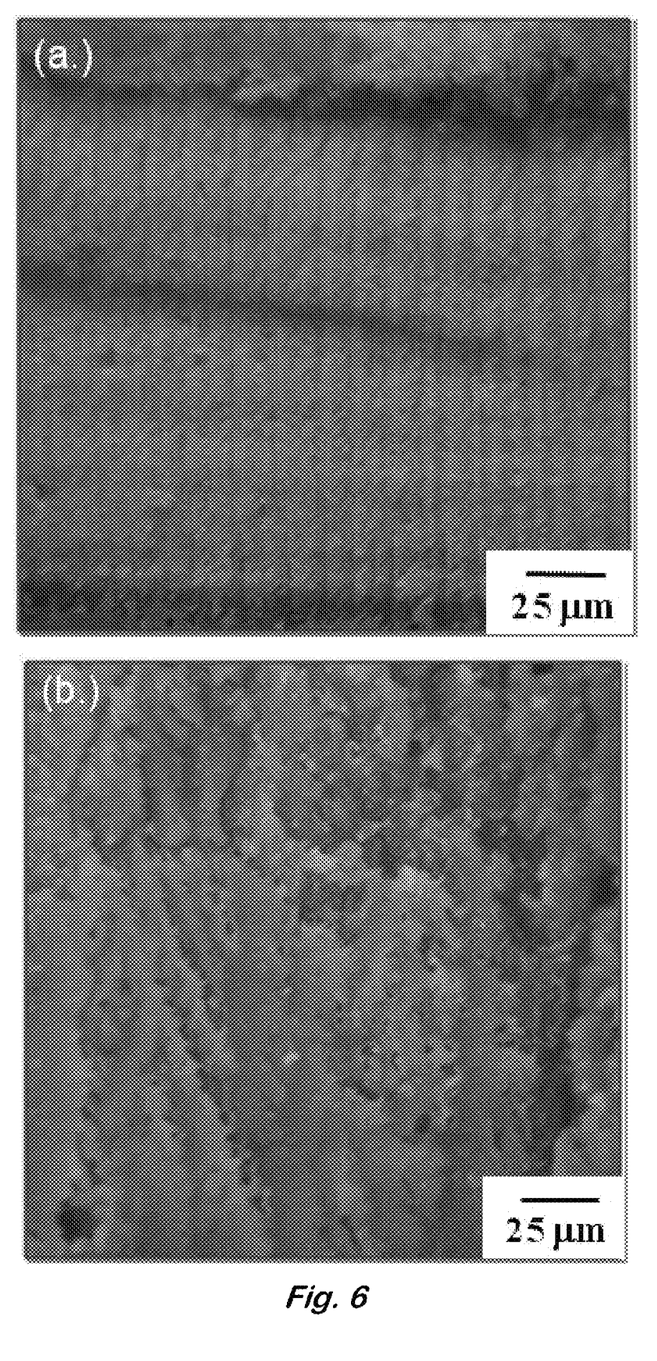
FIG. 6 shows LOM images of (a) 45 vol. % and (b) 65 vol. % barium titanate sintered at 1300° C. for 2 hrs showing the effect of ceramic fraction.

In addition the technique can be used for other ceramic compositions. For instance the samples that have been discussed were 35 vol % ceramic and 75 vol % polymer, but other ratios can be used. FIG. 6 shows the images of samples produced with (a) 45 vol % and (b) 65 vol % barium titanate. By comparing FIG. 3 with FIG. 6 it can be seen that the process works beyond 45 vol % in that the platelets form in the cooling direction. The 65 vol % sample shows that directional freezing technique eventually breaks down. When the amount of ceramic reaches a certain level then the ceramic particles cannot efficiently be expelled from the liquid that is freezing. This leaves a dendritic growth front so that platelets do not form. It can be assumed that there is a lower extreme below which there is not enough ceramic in the liquid to be expelled.

Figure 7:
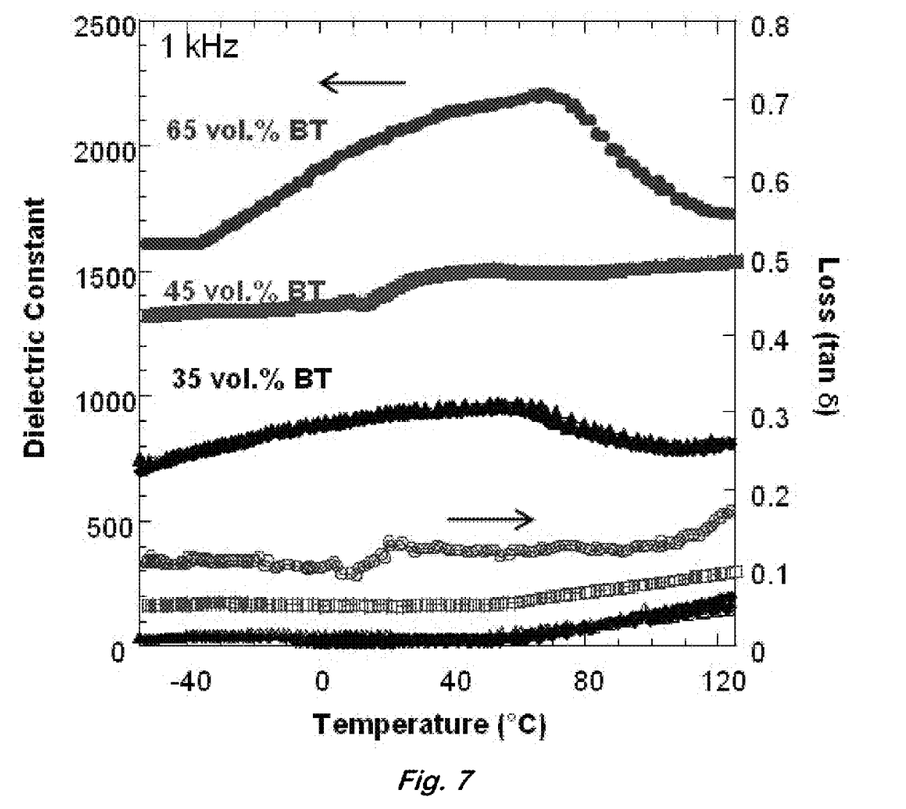
FIG. 7 shows the dielectric constant and loss versus temperature for the freeze-cast barium titanate X7R samples with various barium titanate contents. Arrows indicate the y-axis for which each curve is plotted.
Figure 8:
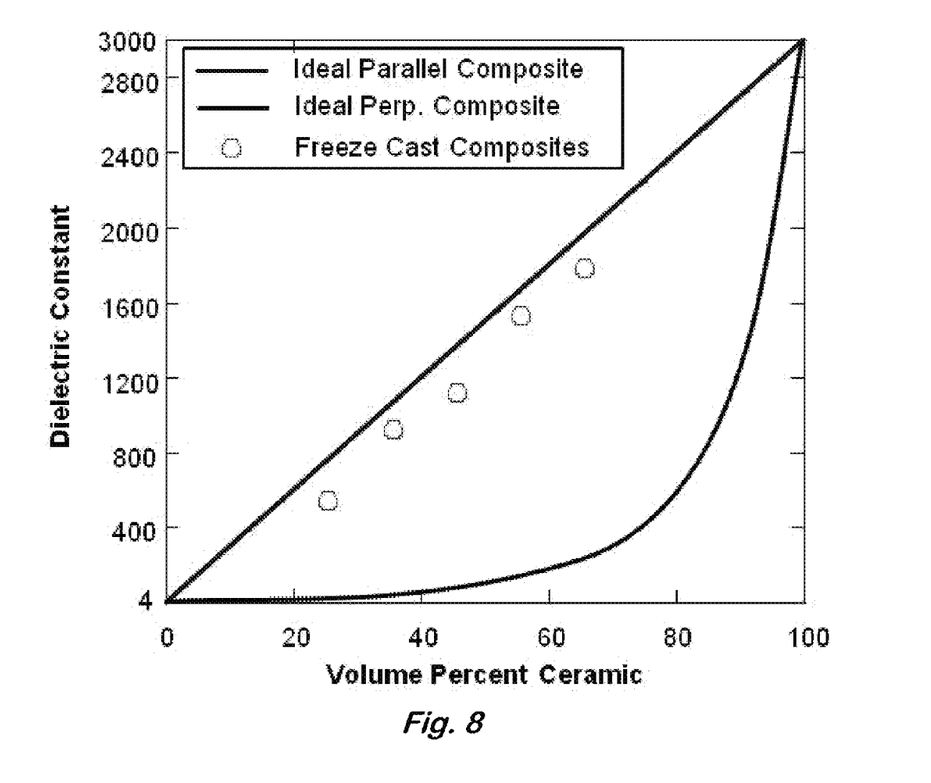
FIG. 8 shows dielectric constant vs. % ceramic data.

The ability to have a large processing window makes the properties of the barium titanate sample tailorable. FIG. 7 shows the dielectric constant versus temperature plots for the samples in FIGS. 3 and 6. It can be seen that as the ceramic percentage is increased the dielectric constant increases. This is because the ceramic is the high dielectric constant material so that as more ceramic is added, the composite dielectric constant increases. In addition, the dielectric loss also follows this trend. Because barium titanate has a higher dielectric loss than the epoxy, as the ceramic percentage increases, so does the dielectric loss. FIG. 8 shows that a plot of dielectric constant as a function of percent ceramic approaches the ideal curve for the parallel arrangement.

Figure 9:
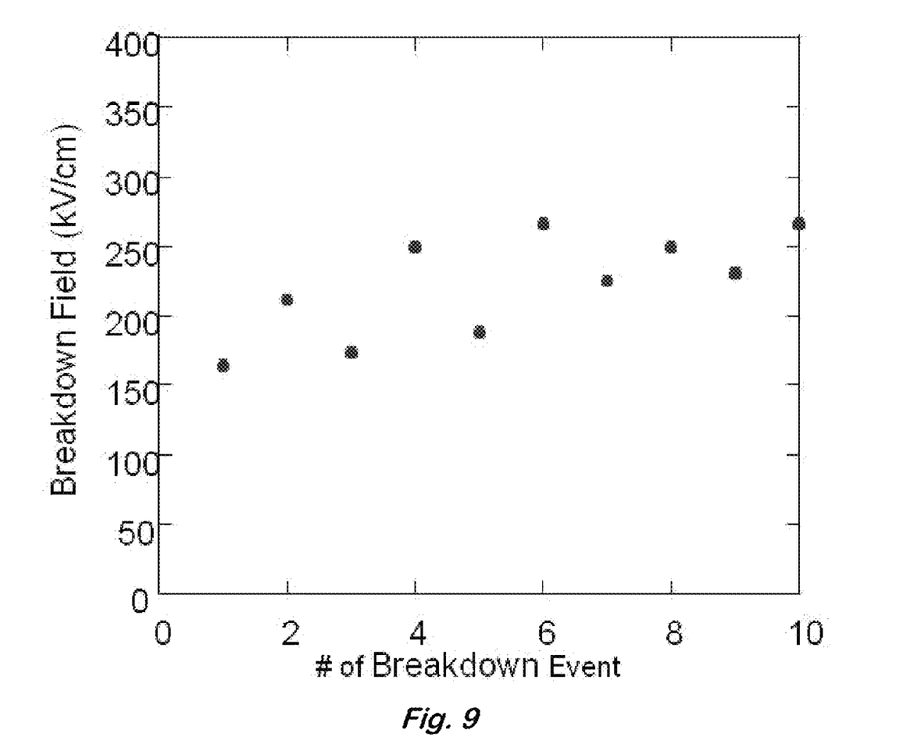
FIG. 9 shows breakdown field versus consecutive breakdown event for the 35 vol % barium titanate sample.
Figure 10:
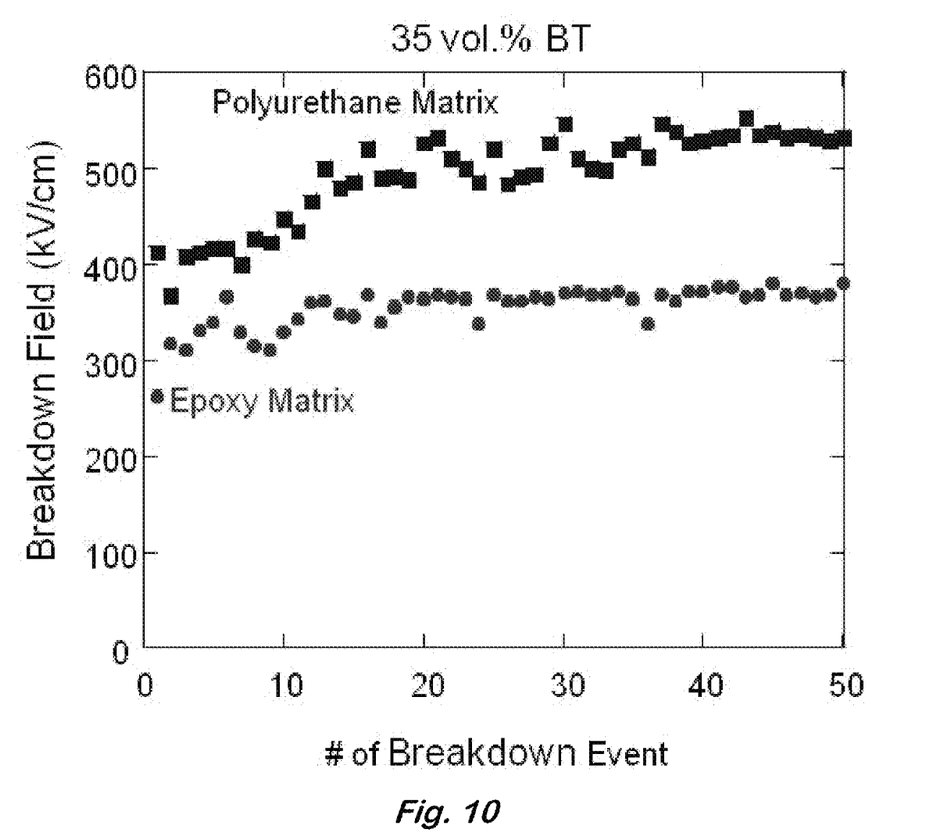
FIG. 10 shows breakdown field versus consecutive breakdown event for the 35 vol % barium titanate sample for both polyurethane and epoxy.

In addition to the dielectric properties the breakdown strength of the sample was also measured. FIG. 9 shows the breakdown strength of the composite barium titanate sample versus the breakdown event number. FIG. 10 shows the same for both epoxy and polyurethane-based materials. These tests were done by increasing the voltage on the sample until a breakdown event occurred. The same sample was ramped up again until another breakdown event occurs and this process was repeated for 10 events. No catastrophic failure or fail-short was observed for this testing range. Since the area around the breakdown is "healed" like in most polymer capacitors, voltage can be re-applied. This means that these composites fail in a graceful manner though the mechanism was not studied further. The breakdown strength increased as the number of breakdown events increased. This is most likely due to the established "weakest link" theory, where breakdown occurs at the weakest point of the sample. Since the next weakest spot, the area where the next breakdown occurs, is stronger then the first the breakdown voltage goes up.

The breakdown voltage for this sample was found to be 200 kV/cm or higher. This breakdown strength is twice the value of normal ceramic monoliths which shows an additional benefit of having the polymer present. Since most of the field goes to the low dielectric constant material, the overall sample can be driven to higher fields before breakdown occurs.

Figure 11:
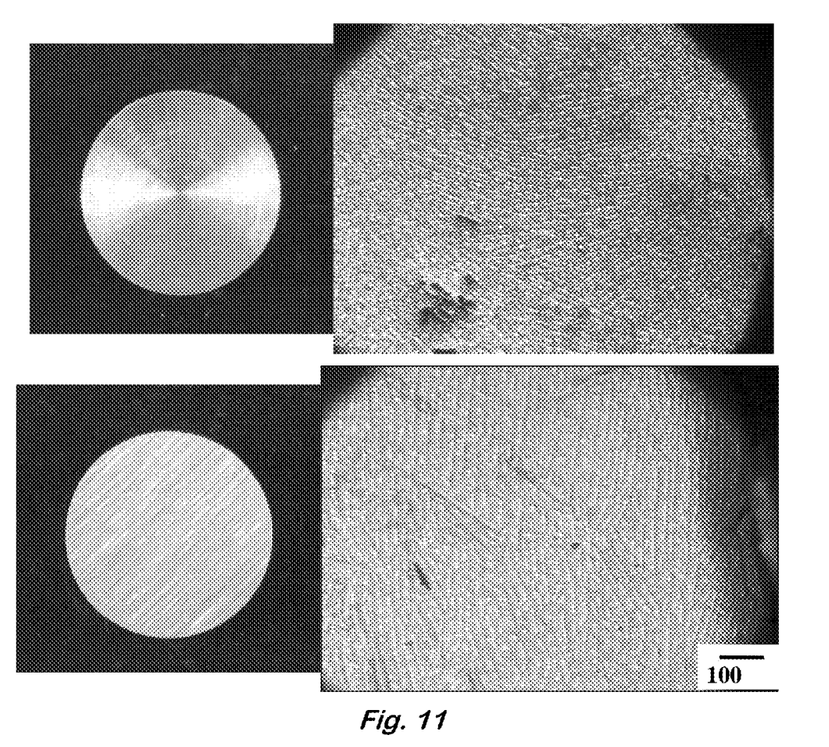
FIG. 11 shows images of as-is (top) and templated (bottom) surfaces used as a cooling elements and the resulting structure of the composite.
Figure 12:
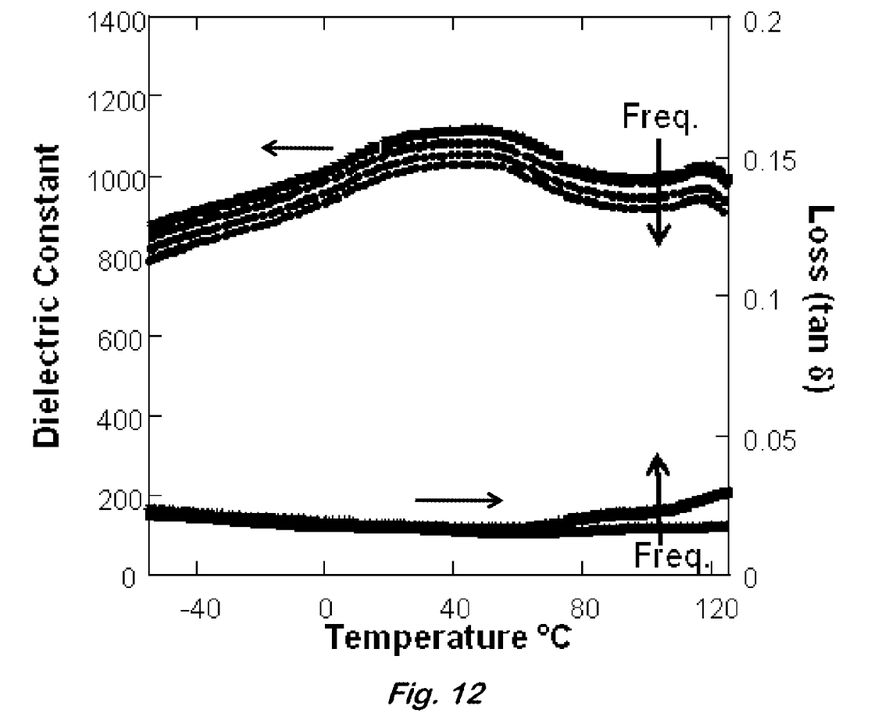
FIG. 12 shows the dielectric constant for templated materials.

The same experiment was also performed growing the ice on a templated surface. The surface was finished using sandpaper to create a texture to promote platelets that are parallel to each other. FIG. 11 shows images of as-is (top) and templated (bottom) surfaces used as a cooling elements and the resulting structure of the composite. FIG. 12 shows that templating resulted in slightly higher dielectric constant (compared to FIG. 4 without templating) due to the extra dimension of alignment. The breakdown behavior still exhibited graceful failure.

Figure 13:
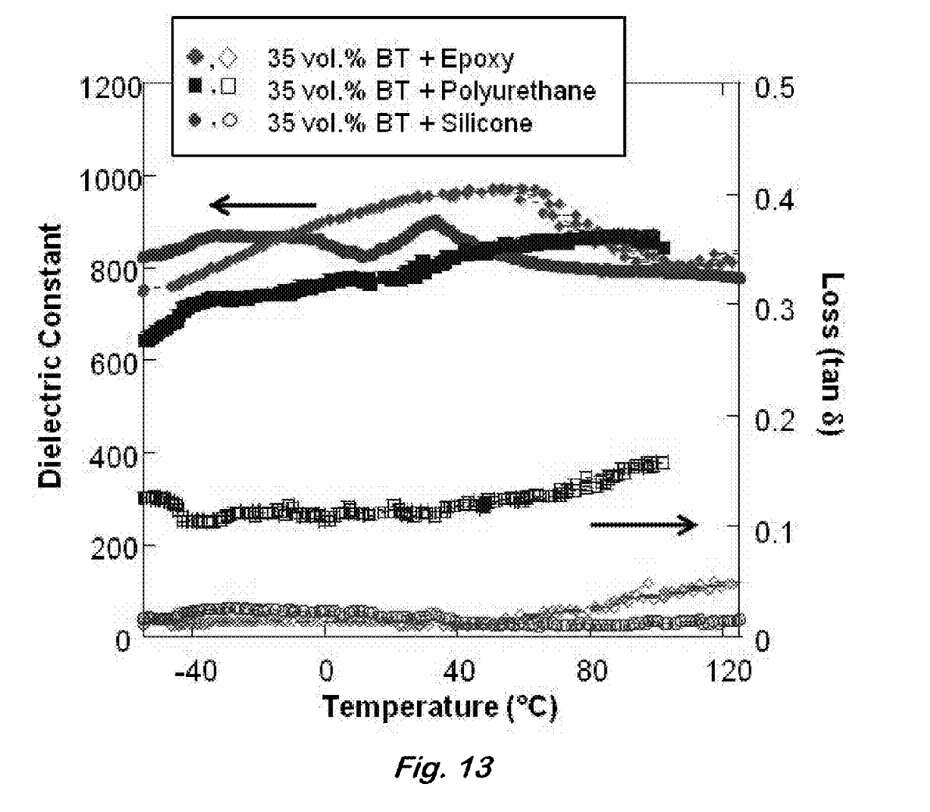
FIG. 13 show the dielectric constant using different polymers.

FIG. 13 shows effect of the polymer matrix on the dielectric constant using epoxy, silicon, and polyurethane, all with 35% barium titanate.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A method of forming a ceramic/polymer composite, comprising:
   providing a cooling element with a templated surface having a parallel template;
   placing a ceramic slurry between the templated surface of the cooling element and an opposing surface parallel to the cooling element, the ceramic slurry comprising:
      a powder of a dielectric material,
      a dispersant,
      a binder, and
      water;
   maintaining the templated surface of the cooling element at a temperature below the temperature of the opposing surface, resulting in a temperature gradient between the cooling element and the opposing surface, thereby forming ice platelets oriented parallel to the temperature gradient and perpendicular to the surface of the cooling element;
   wherein the parallel template of the templated surface of the cooling element is configured to form ice platelets oriented parallel to each other, thereby forming ceramic aggregates aligned parallel to each other between the ice platelets;
   subliming the ice platelets to create voids;
   sintering the ceramic aggregates to form a ceramic dielectric material; and
   filling the voids with a polymeric material, thereby forming a ceramic/polymer composite.

2. The method of claim 1, wherein the dielectric material comprises barium titanate.

3. The method of claim 1, wherein the polymeric material is a thermoplastic or a mixable thermoset polymer.

4. The method of claim 1, wherein the opposing surface is a second cooling element.

5. The method of claim 1, wherein the difference in temperature between the cooling element and the opposing surface is about 5 to about 70° C.

6. The method of claim 1, wherein the cooling element is templated by directional abrasion.

7. The method of claim 1, wherein angles of the ceramic aggregates aligned parallel to each other are within 5° of absolute parallel.

8. The method of claim 1, wherein the ceramic/polymer composite comprises less than 65 vol % ceramic.

9. The method of claim 8, wherein the ceramic/polymer composite comprises from 35 vol % to 45 vol % ceramic.

10. The method of claim 3, wherein the polymeric material is selected from the group consisting of an epoxy, a polyurethane, a polypropylene, and a silicone.

* * * * *